United States Patent
Chen

(10) Patent No.: US 10,236,963 B2
(45) Date of Patent: Mar. 19, 2019

(54) METHOD AND APPARATUS FOR CSI FEEDBACK IN A MIMO WIRELESS COMMUNICATION SYSTEM WITH ELEVATION BEAMFORMING

(71) Applicant: TEXAS INSTRUMENTS INCORPORATED, Dallas, TX (US)

(72) Inventor: Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/447,303

(22) Filed: Mar. 2, 2017

(65) Prior Publication Data

US 2017/0180029 A1 Jun. 22, 2017

Related U.S. Application Data

(63) Continuation of application No. 14/559,637, filed on Dec. 3, 2014, now Pat. No. 9,621,243.

(51) Int. Cl.
*H04B 7/06* (2006.01)
*H04B 7/0456* (2017.01)

(52) U.S. Cl.
CPC ......... *H04B 7/0639* (2013.01); *H04B 7/0469* (2013.01); *H04B 7/0626* (2013.01); *H04B 7/063* (2013.01); *H04B 7/0632* (2013.01)

(58) Field of Classification Search
CPC ............................ H04B 7/0626; H04B 7/0639
See application file for complete search history.

(56) References Cited

U.S. PATENT DOCUMENTS

| | | | |
|---|---|---|---|
| 9,319,120 B2* | 4/2016 | Nagata | H04B 7/0456 |
| 2013/0242773 A1 | 9/2013 | Wernersson et al. | |
| 2013/0258964 A1 | 10/2013 | Nam et al. | |
| 2013/0272151 A1 | 10/2013 | Thomas et al. | |
| 2013/0301448 A1* | 11/2013 | Sayana | H04W 24/10 370/252 |
| 2014/0029463 A1 | 1/2014 | Su | |
| 2014/0036809 A1 | 2/2014 | Xu et al. | |
| 2014/0073337 A1 | 3/2014 | Hong et al. | |
| 2014/0177745 A1* | 6/2014 | Krishnamurthy | H04B 7/0413 375/267 |
| 2014/0204853 A1 | 7/2014 | Ko et al. | |
| 2014/0241323 A1 | 8/2014 | Park et al. | |
| 2015/0078472 A1 | 3/2015 | Vook et al. | |
| 2015/0124726 A1 | 5/2015 | Ni et al. | |
| 2015/0180628 A1 | 6/2015 | Kim et al. | |
| 2015/0200755 A1 | 7/2015 | Hammarwall et al. | |
| 2016/0028519 A1* | 1/2016 | Wei | H04B 7/0456 375/267 |

* cited by examiner

*Primary Examiner* — Freshteh N Aghdam
(74) *Attorney, Agent, or Firm* — Gregory J. Albin; Charles A. Brill; Frank D. Cimino

(57) ABSTRACT

A method of operating a communication system is disclosed. The method includes transmitting a plurality of channel state information reference signal (CSI-RS) sub-resources and a plurality of mode configuration signals to a remote transceiver. The method further includes receiving channel state information (CSI) signals according to the mode configuration signals for the respective sub-resources.

14 Claims, 5 Drawing Sheets

… … …

METHOD AND APPARATUS FOR CSI FEEDBACK IN A MIMO WIRELESS COMMUNICATION SYSTEM WITH ELEVATION BEAMFORMING

BACKGROUND OF THE INVENTION

The present embodiments relate to wireless communication systems and, more particularly, to operation of a communication system in which a user equipment (UE) communicates with a base station (eNB) equipped with a large number of antennas.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are cell-specific reference signals (CRS), channel state information reference signals (CSI-RS), and demodulation reference signals (DMRS). These reference signals are useful for channel measurement at the receiver. Cell-specific reference signals as well as channel state information reference signals are not precoded and are generated by a pseudo-random sequence generator as a function of the physical cell ID. In Releases 8 through 10 of the Long Term Evolution (LTE) of the Universal Mobile Telecommunications System (UMTS), which was designed for conventional point-to-point communication, the cell ID is not explicitly signaled by the base station (called eNB) but is implicitly derived by the UE as a function of the primary synchronization signal (PSS) and secondary synchronization signal (SSS). To connect to a wireless network, the UE performs a downlink cell search to synchronize to the best cell. A cell search is performed by detecting the PSS and SSS of each available cell and comparing their respective signal quality, for example, in terms of reference signal received power (RSRP). After the cell search is performed, the UE establishes connection with the best cell by deriving relevant system information for that cell. Similarly, for LTE Release 11 the UE performs an initial cell search to connect to the best cell. To enable multi-point CoMP operation, the connected cell then configures the UE by higher-layer signaling with a virtual cell ID for each CSI-RS resource associated with each respective base station involved in the multi-point CoMP operation. The UE generates the pseudo-random sequence for each CSI-RS resource as a function of the virtual cell ID.

Conventional cellular communication systems operate in a point-to-point single-cell transmission fashion where a user terminal or equipment (UE) is uniquely connected to and served by a single cellular base station (eNB or eNodeB) at a given time. An example of such a system is Release 8 of the 3GPP Long-Term Evolution. Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system. This greatly improves received signal strength at the UE by transmitting the same signal to each UE from different base stations. This is particularly beneficial for cell edge UEs that observe strong interference from neighboring base stations.

Most UEs which communicate with a single eNB are configured with a single CSI-RS resource. Other UEs may be configured for CoMP where multiple eNBs coordinate with each other in servicing the UE. In particular, DL transmission from multiple adjacent eNBs is coordinated to avoid or cancel inter-cell interference. This effectively reduces interference and boosts the signal-to-noise ratio at the UE. One example of CoMP transmission is joint processing, where data for a single UE might be transmitted from multiple adjacent eNBs. A UE receiving CoMP transmission, therefore, needs to be configured with multiple CSI-RS resources in order to measure respective channels of multiple eNBs. In this case, each CSI-RS resource is separately configured by higher layer RRC signaling including the CSI-RS antenna port number, a CSI-RS resource index, periodicity and offset of the CSI-RS transmission, and relative transmit power of the CSI-RS.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base station's coverage area is further divided into cells. In the illustrated network, each base station's coverage area is divided into three cells such as 104a, 104b, and 104c. A handset or other user equipment (UE) 107 is shown in cell A 104a. Cell A is within coverage area 104 of base station 101. Base station 101 transmits to and receives transmissions from UE 107 over channel 108. UE 107 is configured with CSI-RS resources to measure channel 108 from eNB 101. UE 107 may also receive transmissions from eNB 102. UE 107 is configured by higher layer RRC signaling with separate CSI-RS resources in order to measure channel 109 from eNB 102.

Base stations 101 and 102 configure UE 107 for periodic uplink Sounding Reference Signal (SRS) transmission. Base station 101 estimates channel quality from the SRS transmissions. For downlink (DL) data transmission, UE 107 measures the DL wireless channel from DL reference signals and reports Channel State Information (CSI) to the eNB. The eNB uses the CSI report to perform DL link adaptation and scheduling to determine data transmission schemes to the UE, including time/frequency resource assignment, modulation, and coding schemes.

The DL reference signals used by UE 107 may be Cell-specific Reference Signals (CRS) or Channel State Information Reference Signals (CSI-RS) in LTE. The CSI-RS resource configuration includes a number of CSI-RS antenna ports, a CSI-RS resource index, periodicity of CSI-RS transmission, and relative transmit power of the CSI-RS. CSI is reported in the form of a set of recommended MIMO transmission properties to the eNB. CSI includes a Channel Quality Indicator (CQI), precoding matrix indicator (PMI), and rank indicator (RI). RI indicates the number of data layers that the UE recommends the eNB to transmit. PMI is the index to a recommended precoding matrix in a predetermined codebook known to the eNB and the UE. CQI reflects the channel quality that the UE expects to experience if the recommended RI and PMI are used for data transmission. The time and frequency resources that can be used by the UE to report CSI are controlled by the eNB. The UE is semi-statically configured by higher layers to periodically feedback different CSI components (CQI, PMI, PTI, and RI)

on the Physical Uplink Control Channel (PUCCH). Different PUCCH modes can be configured for CSI feedback.

FIG. 2 illustrates CSI-RS resources in a physical resource block (PRB) pair that can be configured for a UE using 2Tx, 4Tx, and 8TX MIMO, respectively, for an OFDM system with a normal cyclic prefix (CP). These CSI-RS resources allow the UE to perform channel estimation. The number of CSI-RS resources varies according to the antenna configuration. For each channel that the UE needs to measure, one of the available CSI-RS configurations is specified to the UE by higher layer signaling. FIG. 3 is similar to FIG. 2 and illustrates CSI-RS resources in a physical resource block (PRB) pair that can be configured for a UE using 2Tx, 4Tx, and 8TX MIMO, respectively, for an OFDM system with an extended cyclic prefix (CP).

The difference between a physical antenna and an antenna port is herein described for the multi-vendor LTE system. Different eNB vendors may deploy different numbers of physical antennas at their eNB products. Furthermore, the number of physical antennas for different types of base stations may be different. For example, a macro base station designed for wide area coverage may deploy a large antenna array, while a small form-factor base station (e.g. a pico- or femto-cell base station) that is designed to cover a relatively small area may deploy a small number of physical antennas. In order to limit standardization efforts while allowing sufficient implementation flexibility for eNB vendors, LTE has adopted the "antenna port" concept. An antenna port is a reference signal on which the wireless propagation channel property experienced by one signal can be inferred by another signal. As such, an antenna port is uniquely determined by a reference signal from which the UE can measure the associated channel. Hence, if two physical antennas are used to transmit the same reference signal, they appear to a UE as one antenna port. In this case, the UE is not able to differentiate between these two physical antennas. The mapping between physical antennas and antenna ports is determined by the eNB and may be transparent to the UE. Therefore, the UE can differentiate between different antenna ports, because they are associated with different reference signals, but it cannot differentiate between different physical antennas.

While the preceding approaches provide steady improvements in interference measurement and Channel State Information reporting for wireless communications, the present invention is directed to further improvements. Accordingly, preferred embodiments described below are directed toward this as well as improving upon the prior art.

BRIEF SUMMARY OF THE INVENTION

In a preferred embodiment of the present invention, there is disclosed a method of operating a wireless communication system. In one embodiment, measurement and feedback of channel state information from a UE to a base station equipped with a large number of transmit antennas is disclosed. The method includes transmitting a plurality of channel state information reference signal (CSI-RS) sub-resources and a plurality of mode configuration signals to a remote transceiver. The method further includes receiving independent channel state information (CSI) signals according to the mode configuration signals for the respective sub-resources.

DETAILED DESCRIPTION OF THE INVENTION

Figure 1:
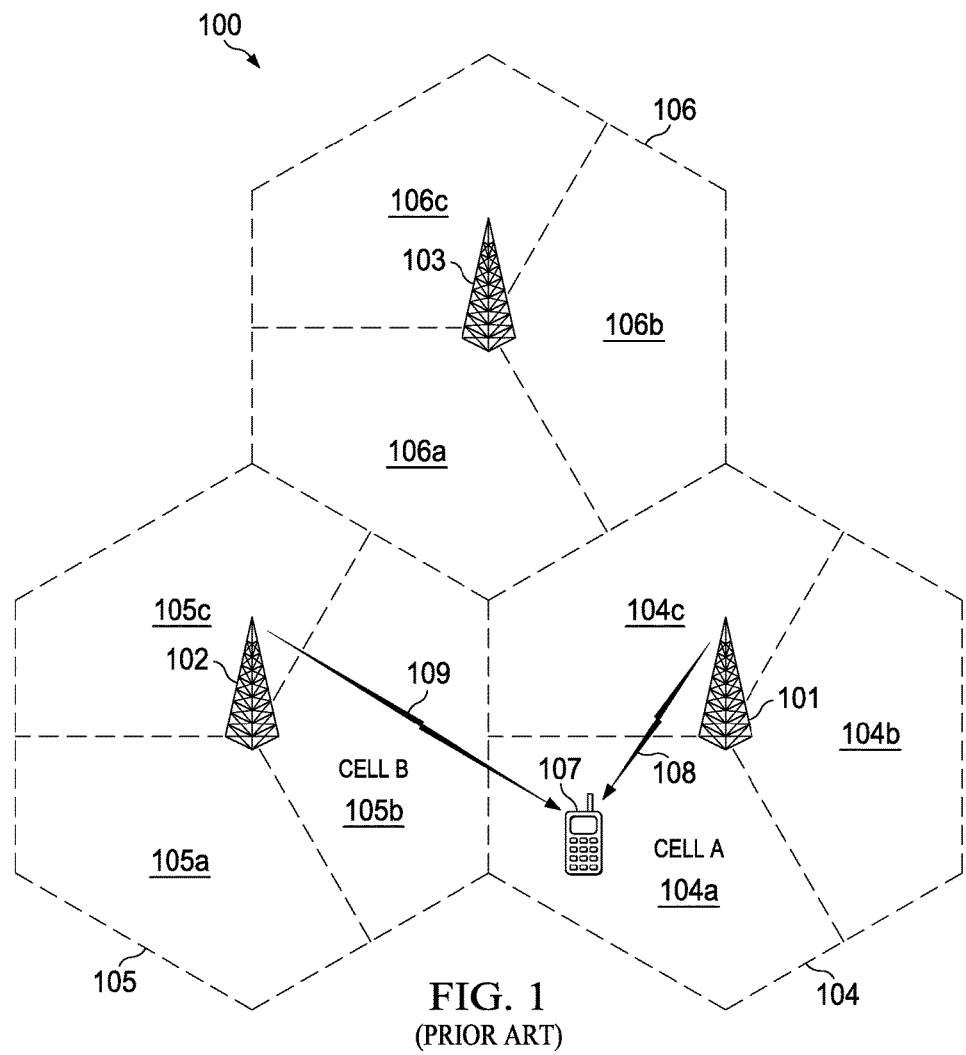
FIG. 1 is a diagram of a wireless communication system of the prior art.
Figure 2:
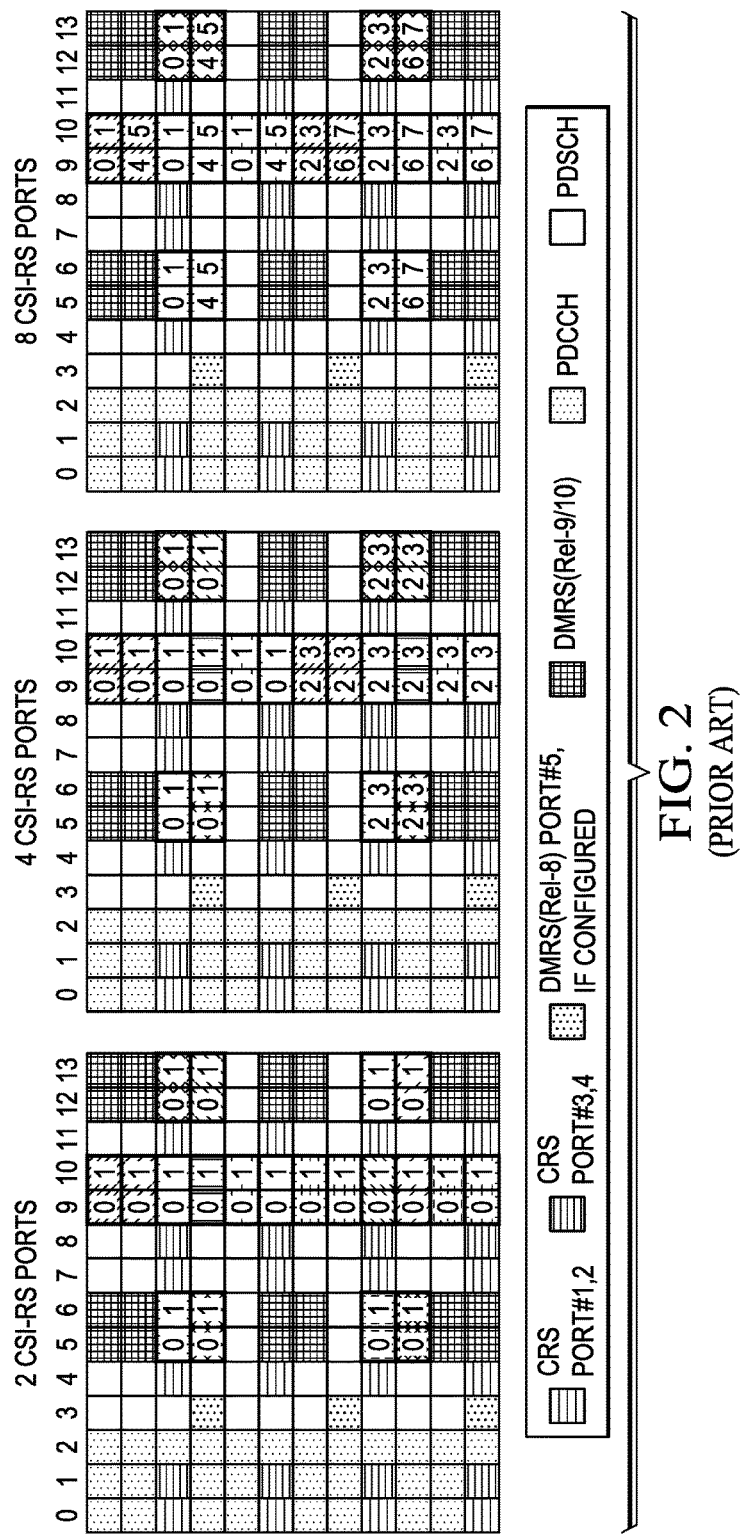
FIG. 2 is a diagram of the prior art illustrating CSI-RS resources that may be configured for a UE to measure a channel using 2Tx, 4Tx, and 8Tx MIMO with a normal cyclic prefix (CP)
Figure 3:
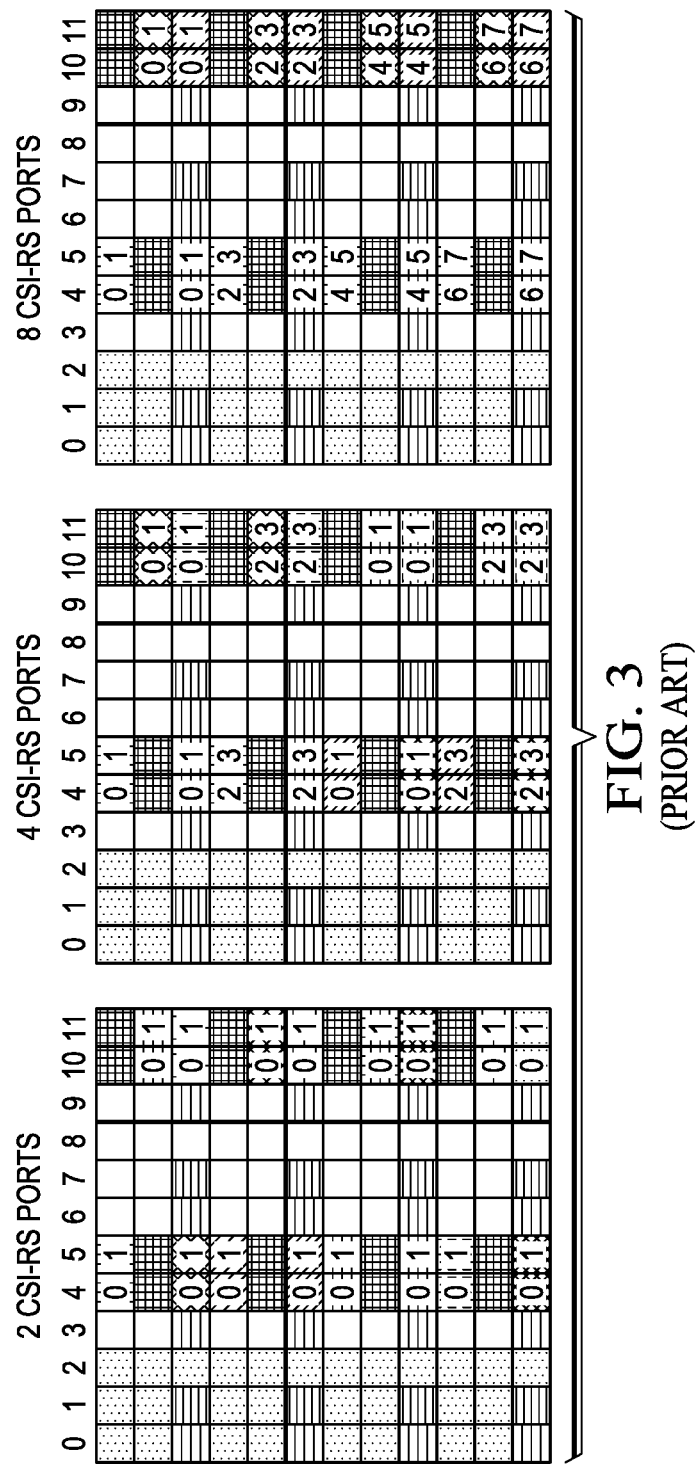
FIG. 3 is a diagram of the prior art illustrating CSI-RS resources that may be configured for a UE to measure a channel using 2Tx, 4Tx, and 8Tx MIMO with a normal cyclic prefix (CP)

Communication of downlink control information from a base station (eNB) to a user equipment (UE) for Long Term Evolution (LTE) with backwards compatibility to legacy systems is essential for operating a coordinated multi-point (CoMP) LTE wireless communication system. This control information specifies the location of respective data signals for the UE within received subframes. Accordingly, embodiments of the present invention employ both localized and distributed transmission of control information to improve communication from the eNB to the UE as will be described in detail.

Some of the following abbreviations are used throughout the instant specification.

CCE: Control Channel Element
CQI: Channel Quality Indicator
CRS: Cell-specific Reference Signal
CSI: Channel State Information
CSI-IM: Channel State Information Interference Measurement
CSI-RS: Channel State Information Reference Signal
CoMP: Coordinated Multiple-Point transmission
DCI: DownLink Control Information
DL: DownLink
DMRS: Demodulation Reference Signal
eICIC: Enhanced Inter-cell Interference Coordination
eIMTA: Enhanced Interference Mitigation
eNB: E-UTRAN Node B or base station or evolved Node B
EPDCCH: Enhanced Physical Downlink Control Channel
E-UTRAN: Evolved Universal Terrestrial Radio Access Network
feICIC: Further Enhanced Inter-cell Interference Coordination
HARQ: Hybrid Automatic Repeat Request
ICIC: Inter-cell Interference Coordination
IRC: Interference Rejection Combining
JT: Joint Transmission
LTE: Long Term Evolution
MIMO: Multiple-Input Multiple-Output
MRC: Maximum Ratio Combining
PCFICH: Physical Control Format Indicator Channel
PDCCH: Physical Downlink Control Channel
PDSCH: Physical Downlink Shared Channel
PMI: Precoding Matrix Indicator
PRB: Physical Resource Block
PUCCH: Physical Uplink Control Channel
PUSCH: Physical Uplink Shared Channel QAM: Quadrature Amplitude Modulation
RE: Resource Element
RI: Rank Indicator
RRC: Radio Resource Control
SCID: Scrambling Identification
SIB1: System Information Block Type 1
SNR: Signal to Noise Ratio
TDD: Time Division Duplex
UE: User Equipment
UL: UpLink
VRB: Virtual Resource Block
ZP-CSI-RS: Zero-power Channel State Information Reference Signal Scheduling in a wireless network is achieved by the base station (eNB in LTE) transmitting downlink control information to mobile terminals (UE in LTE). In a cellular wireless network, a base station may need to schedule transmissions to multiple mobile users at the same time. As a result, the base station needs to transmit downlink control information to different users simultaneously. It is also possible that the base station may transmit different types of control information to a UE simultaneously, such as common control information and UE-specific control information.

In LTE, downlink control information bits are carried in a Downlink Control Information (DCI) format. A DCI is channel encoded, modulated, and transmitted in a specific physical transmission channel over an air interface. In a legacy system, DCI formats are transmitted by the Physical Downlink Control Channel (PDCCH). A PDCCH is transmitted in the legacy PDCCH region. Different DCI formats are used for different scheduling purposes. DCI can be used to transmit common control information to all users in a cell, UE-specific downlink control information to schedule PDSCH data transmission to a UE, or UE-specific downlink control information to schedule uplink data transmission from the UE to the eNB.

Table I below is a relation between DCI formats and corresponding downlink transmission modes. The DCI formats are UE-specific, monitored by UEs, and scrambled by C-RNTI.

| DL Mode | DCI format | Transmission scheme |
| --- | --- | --- |
| Mode 1 | DCI 1A | Single antenna port with cell-specific reference signal (CRS) port 0 |
| Mode 2 | DCI 1 | Transmit diversity |
| Mode 3 | DCI 2A | Open-loop spatial multiplexing |
| Mode 4 | DCI 2 | Closed-loop spatial multiplexing |
| Mode 5 | DCI 1D | Single-layer multiuser MIMO with CRS |
| Mode 6 | DCI 1B | Single-layer closed-loop precoding with CRS |
| Mode 7 | DCI 1 | Single-layer beamforming with demodulation reference symbol (DMRS) port 5 |
| Mode 8 | DCI 2B | Dual-layer spatial multiplexing with DMRS ports 7-8 |
| Mode 9 | DCI 2C | 8-layer spatial multiplexing with DMRS ports 7-14 |
| Mode 10 | DCI 2D | Coordinated Multi-Point communication, 8-layer spatial multiplexing with DMRS ports 7-14 |

Figure 4:
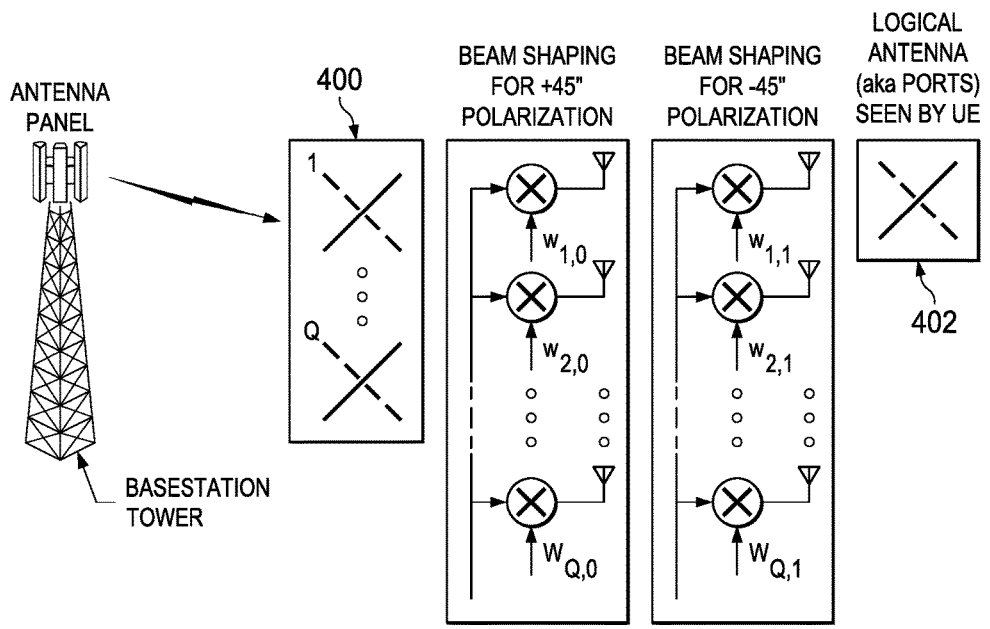
FIG. 4 is a diagram illustrating amplitude and phase scaling of a signal from a physical antenna to an antenna port.

FIG. 4 illustrates the principle of amplitude and phase scaling in the elevation domain of a signal from a panel of physical antennas 400 to a UE antenna port 402. Here, a panel comprising Q physical antenna panels 400 are cross phased and applied to beam shaping circuits prior to signal transmission. The signal is multiplied by respective weights $w_{1-Q,0}$ for +45" polarization and by respective weights $w_{1-Q,1}$ for −45" polarization. Both weighted signals are transmitted by Q respective antennas such that in phase signals in an elevation direction of a particular UE are reinforced, thereby improving a received signal-to-noise ratio. It is noted that with conventional antenna technologies, co-phasing is typically performed in the analog domain by phase shifting. Therefore, coefficients $w_{i,j}$ (i=1 . . . Q, j=0,1) are complex variables with power equal to 1, performing phase rotation only. The UE sees a logical received signal 402 as a single antenna port rather than Q separate physical antennas. As a result of using the antenna port concept, an LTE system standardizes a fixed number of antenna ports while allowing different eNB vendors to use an arbitrary number of physical antennas.

Recent advances in radio frequency (RF) and integrated circuit (IC) design have made significant improvements in advanced eNB antenna deployments possible. In particular, 3-dimensional beamforming and high-order MIMO according to embodiments of the present invention are possible. Typical eNB antenna deployment for 3GPP LTE may include an array of cross-polarized or co-polarized antennas that are spaced apart in the azimuth domain. For 3-dimensional beamforming, each antenna includes an integral number of sub-elements arranged in a vertical configuration to achieve a desired elevation pattern and overall gain in the elevation domain by co-phasing. When these vertically arranged sub-elements are individually and adaptively controlled in the digital domain, the antenna array adapts transmissions in both azimuth and elevation to allow much more flexible antenna pattern shaping, adaptive beamforming, and adaptive cell shaping.

Figure 5:
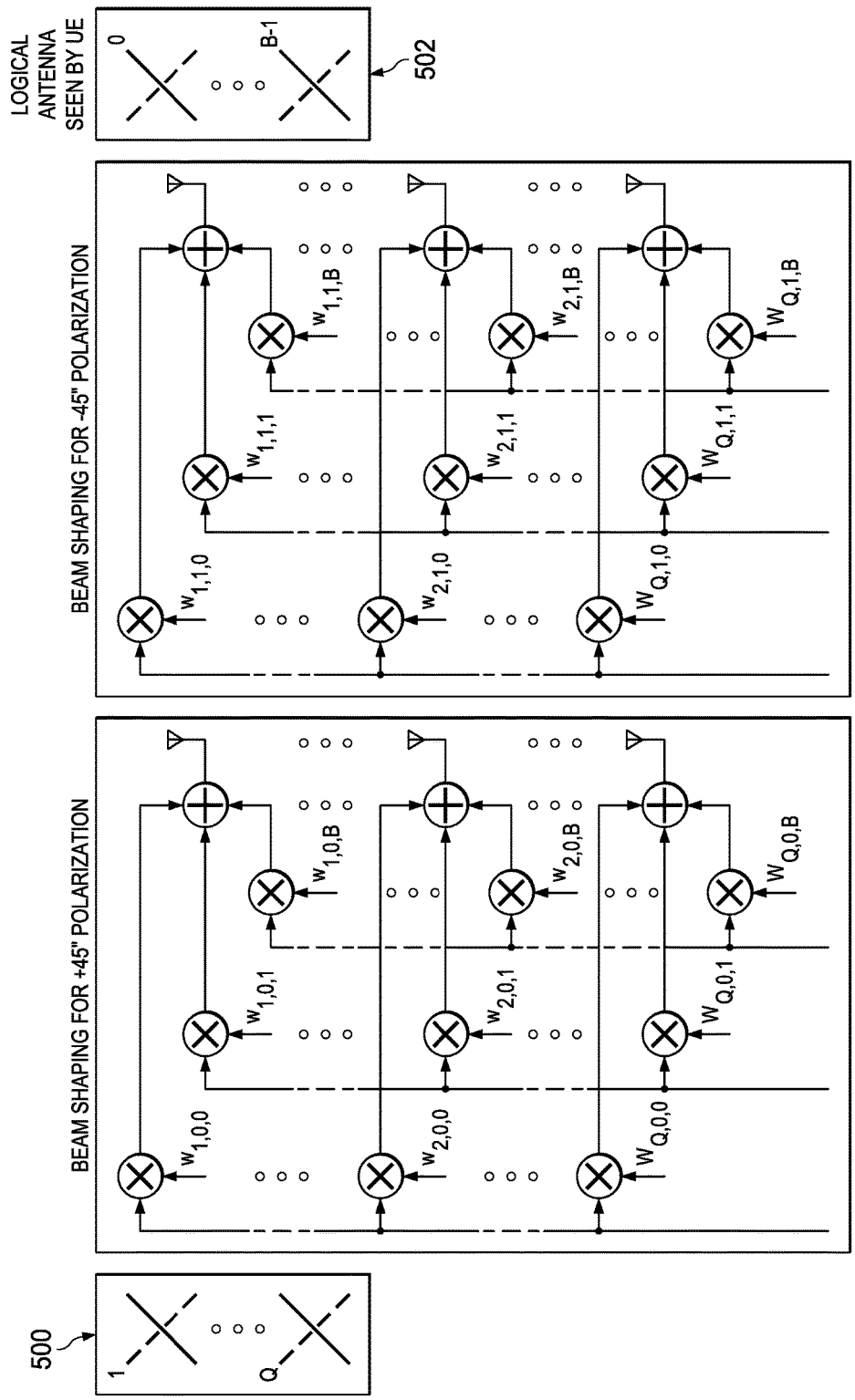
FIG. 5 is a diagram of a base station having multiple antennas for azimuth and elevation beamforming.

Referring to FIG. 5, there is a diagram of a base station having multiple antennas for azimuth and elevation beamforming. The system maps Q physical antennas 500 into B antenna ports 502. Weight signals $w_{N,M,B}$ are phase and amplitude scale factors for each antenna panel of the Q physical antennas. Subscript N represents the physical antenna panel, M represents the corresponding antenna port in the azimuth direction, and B represents the corresponding antenna panel in the elevation direction. Each antenna panel is individually controlled for azimuth and elevation beamforming. This permits more efficient communication between the eNB and the UE by minimizing inter-cell interference and improving the SNR at the UE. Individual control, however, requires an increase in antenna ports from 1, 2, 4, or 8 of LTE legacy systems to 16, 32, 64, or even more for large antenna deployments. This also requires new DL reference signal design and configuration as well as a new channel state information (CSI) feedback mechanism.

A new CSI-RS design is disclosed in copending application Ser. No. 14/222,553 (TI-73611), filed March 2014, and incorporated herein by reference in its entirety. A UE configured with one CSI process to measures a DL channel of a single eNB is configured with one CSI-RS resource. This CSI-RS resource is associated with two CSI-RS sub-resources, denoted sub-resource 1 and sub-resource 2. As an exemplary use case, CSI-RS sub-resource 1 is used by the UE to report CSI for antenna panels, and sub-resource 2 is used to report CSI to the virtual MIMO array. Each CSI sub-resource is independently configured by higher layer RRC signaling with a set of parameters that may include some or all of the number of CSI-RS antenna ports, CSI-RS resource index, CSI-RS subframe periodicity and offset, and the ratio of energy-per-resource-element (EPRE) of CSI-RS relative to relative PDSCH transmission power ρ. In one embodiment, the EPRE ratio ρ is configured for the CSI-RS resource but not configured for each sub-resource. In another embodiment, the EPRE ratio ρ is configured for one CSI-RS sub-resource but not configured for the other CSI-RS sub-resource.

The number of CSI-RS antenna ports for each CSI-RS sub resource k (k=1,2) is equal to a corresponding number of CSI-RS antenna ports in LTE Rel. 11 (e.g. 1, 2, 4, or 8). The total number of CSI-RS antenna ports of the CSI-RS resource ($N_t$) is a function of the number of CSI-RS antenna ports of both sub-resource 1 ($N_{t,1}$) and sub-resource 2 ($N_{t,2}$). In one embodiment, $N_t = N_{t,1} \times N_{t,2}$, corresponding to a square antenna array. The CSI-RS resource index for each CSI-RS sub-resource k (k=1,2) is equal to a corresponding CSI-RS resource index in LTE Rel. 11 and is dependent on the number of CSI-RS antenna ports ($N_{t,k}$) configured for the corresponding CSI-RS sub-resource k (k=1,2). The CSI-RS subframe periodicity and offset are separately configured for CSI-RS sub-resource 1 and sub-resource 2. Furthermore, the subframe periodicity of one sub-resource may be an integer multiple of the other sub-resource periodicity. For example, sub-resource 1 may be used to measure the CSI of sub-elements within one antenna panel, and sub resource 2 may be used to measure CSI between various antenna panels.

Figure 6:
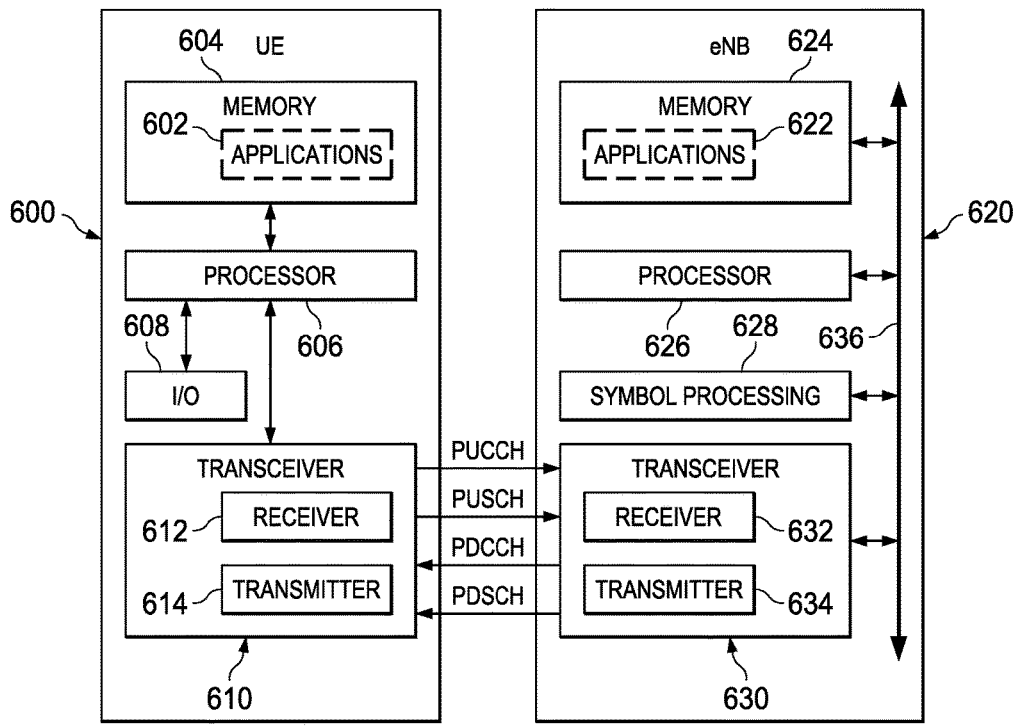
FIG. 6 is a block diagram showing operation of a user equipment and a base station according to the present invention.

Turning now to FIG. 6, there is a diagram showing communication between user equipment (UE) 600 and a base station (eNB) 620 according to the present invention. UE 600 may be a cell phone, computer, or other wireless network device. UE 600 includes a processor 606 coupled to a memory 604 and a transceiver 610. Processor 606 may include several processors adapted to various operational tasks of the UE including signal processing and channel measurement and computation. The memory stores application software that the processor may execute as directed by the user as well as operating instructions for the UE. Processor 606 is also coupled to input/output (I/O) circuitry 608, which may include a microphone, speaker, display, and related software. Transceiver 610 includes receiver 612 and transmitter 614, suitable for wireless communication with eNB 620. Transceiver 610 typically communicates with eNB 620 over various communication channels. For example, transceiver 610 sends uplink information to eNB 620 over physical uplink control channel PUCCH and physical uplink shared channel PUSCH. Correspondingly, transceiver 610 receives downlink information from eNB 620 over physical downlink control channel PDCCH and physical downlink shared channel PDSCH.

Base station 620 includes a processor 626 coupled to a memory 624, a symbol processing circuit 628, and a transceiver 630 via bus 636. Processor 626 and symbol processing circuit 628 may include several processors adapted to various operational tasks including signal processing and channel measurement and computation. The memory stores application software that the processor may execute for specific users as well as operating instructions for eNB 620. Transceiver 630 includes receiver 632 and transmitter 634, suitable for wireless communication with UE 600. Transceiver 630 typically communicates with UE 600 over various communication channels. For example, transceiver 630 sends downlink information to UE 600 over physical downlink control channel PDCCH and physical downlink shared channel PDSCH. Correspondingly, transceiver 630 receives uplink information from UE 600 over physical uplink control channel PUCCH and physical uplink shared channel PUSCH.

Once communication is established with eNB 620, transceiver 610 receives an uplink (UL) grant in a downlink (DL) subframe. Transceiver 610 uses the CRS or CSI-RS in one or more of the DL subframes to create a CSI measurement report that is transmitted to eNB 620 in a subsequent UL subframe. The CSI reports may be periodic on the PUCCH or aperiodic on the PUSCH. CSI feedback for CSI-RS sub-resource 1 and sub-resource 2 are preferably independently configured by higher layer RRC signaling to include all or a subset of Rank Indicator (RI), Precoding Matrix Indicator (PMI), and Channel Quality Indicator (CQI) parameters. For example, CSI-RS sub-resource 1 may be configured to feedback $PMI_1$ to inform eNB of co-phasing information of sub-elements within one antenna panel, reflecting channel information in the elevation domain. CSI-RS sub-resource 2 may be configured to feedback RI, PMI, and CQI, where RI indicates the number of beam-forming layers in the horizontal domain. As another example, CSI-RS sub-resource 1 may be configured to feedback RI and PMI, while CSI-RS sub-resource 2 may be configured to feedback PMI and CQI. As yet another example, sub-resource may be configured for a wideband report, while sub-resource 2 is configured for a subband frequency-selective report.

Periodic CSI feedback on the PUCCH for CSI-RS sub-resource 1 and sub-resource 2 are independently configured with their respective feedback periodicity and/or offset. For example, a CSI report for sub-resource 1 may be configured with a large feedback periodicity for less frequent CSI reports, while a CSI report for sub-resource 2 may be configured with a smaller feedback periodicity for more frequent CSI reports. This may be desirable when the channel correlation between antenna sub-elements within one array panel is highly correlated and temporarily more stable, especially as user equipment do not move quickly in the vertical domain. The feedback periodicity for CSI sub-resource 2 can be configured with a larger periodicity when needed to more efficiently follow the channel variation of the UE moving in the vertical domain. Feedback offset for CSI sub-resource 1 and sub-resource 2 may be configured to be the same, so that CSI for sub-resource 1 and CSI for sub-resource 2 may be reported in the same subframe. This increases the feedback overhead and may be difficult for PUCCH formats 1, 1a, 1b, 2, 2a, and 2b, which each have a maximum 11-bit CSI payload. PUCCH format 3, however, has a maximum 22-bit CSI payload and may be preferable for this configuration. Feedback offset for CSI sub-resource 1 and sub-resource 2 may also be configured to be different so that CSI for sub-resource 1 and sub-resource 2 are reported in different subframes. Since this does not increase the feedback overhead, PUCCH formats 2, 2a, 2b, and 3 may be used. Finally, CSI sub-resource 1 and sub-resource 2 may be configured with different reporting priority. In the event two CSI reports for the two respective sub-resources collide in the same subframe, CSI for the CSI-RS sub-resource with the highest priority is reported while CSI for the CSI-RS sub-resource with the lower priority is dropped.

For aperiodic CSI feedback, it is preferable that one UL grant should trigger concurrent CSI reports for sub-resource 1 and sub-resource 2 in the same UL PUSCH subframe to provide eNB with full channel information in both horizontal and vertical domains. It is also preferable that the bit sequence of the CSI report for sub-resource 1 precede the bit sequence of the CSI report for sub-resource 2. However, it is possible that an UL grant may trigger CSI feedback for only one sub-resource. In one embodiment of the present invention, when a 1-bit CSI trigger is used, a logical 0 indicates no CSI report is transmitted, and a logical 1 indicates a CSI report for CSI-RS sub-resource 1 and sub-resource 2. In another embodiment of the present invention, when a 2-bit CSI trigger is used, a logical 00 indicates no CSI report is transmitted, a logical 01 indicates a CSI report for CSI-RS sub-resource 1, a logical 10 indicates a CSI report for CSI-RS sub-resource 2, and a logical 11 indicates a CSI report for CSI-RS sub-resource 1 and sub-resource 2. This advantageously provides selected CSI reports for CSI-RS sub-resources having the same or different reporting times. For instance, when the UE moves slowly in the vertical domain but quickly in the horizontal domain, it is not necessary for the eNB to always trigger CSI feedback for both dimensions at the same time. Therefore, the eNB may trigger CSI feedback for the sub-resource corresponding to the horizontal domain without triggering CSI feedback for the sub-resource corresponding to the vertical domain.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of reporting channel state information for wireless communication in a system in which a user equipment (UE) is configured for communication with a base station, the method comprising:
   receiving from said base station a channel state information reference signal (CSI-RS) that has been associated with two different subresources; and
   in response to one grant from said base station,
   sending channel state information in response to the CSI-RS for a first of said subresources, wherein said channel state information is a set of parameters that includes all or a first subset of Rank Indicator, Precoding Matrix Indicator, and Channel Quality Indicator parameters; and
   sending channel state information in response to the CSI-RS for a second of said subresources, wherein said channel state information is a second subset of Rank Indicator, Precoding Matrix Indicator, and Channel Quality Indicator parameters, and wherein said first subset of parameters is different from said second subset.

2. The method of claim 1 wherein one of said channel state information in response to the CSI-RS for the first of said subresources or said channel state information in response to the CSI-RS for the second of said subresources is wideband and the other of said channel state information is subband frequency selective.

3. The method of claim 1 wherein said Precoding Matrix Indicator parameter includes co-phasing information of sub-elements within an antenna panel that reflects channel information in the elevation domain.

4. A method of reporting channel state information for wireless communication in a system in which a user equipment (UE) is configured for communication with a base station having at least one antenna that includes sub-elements arranged to achieve a desired elevation pattern, the method comprising:
   receiving from said base station a channel state information reference signal (CSI-RS) that has been associated with two different subresources; and
   in response to one grant from said base station,
   sending channel state information in response to the CSI-RS for a first of said subresources, wherein said channel state information includes a parameter reflecting channel information in the elevation domain;
   sending channel state information in response to the CSI-RS for a second of said subresources, wherein said channel state information includes a parameter reflecting channel information in the horizontal domain.

5. The method of claim 4 wherein sending channel state information in response to the CSI-RS for the first of said subresources is performed before sending channel state information in response to the CSI-RS for the second of said subresources.

6. A method of reporting channel state information for wireless communication in a system in which a user equipment (UE) is configured for communication with a base station, the method comprising:
   receiving from said base station a channel state information reference signal (CSI-RS) that has been associated with two different subresources; and
   in response to one grant from said base station,
   sending channel state information in a subframe in response to the CSI-RS for a first of said subresources, wherein said channel state information has a first feedback periodicity;
   sending channel state information in a subframe in response to the CSI-RS for a second of said subresources, wherein said channel state information has a second feedback periodicity, wherein said first feedback periodicity and said second feedback periodicity are different.

7. The method of claim 6 wherein sending said channel state information in said subframe in response to the CSI-RS for said first of said subresources and sending said channel state information in said subframe in response to the CSI-RS for said second of said subresources occur in the same subframe.

8. The method of claim 7 wherein sending said channel state information in said subframe in response to the CSI-RS for said first of said subresources and sending said channel state information in said subframe in response to the CSI-RS for said second of said subresources are performed on the Physical Uplink Control Channel (PUCCH) using format 3.

9. The method of claim 6 wherein sending said channel state information in said subframe in response to the CSI-RS for said first of said subresources and sending said channel state information in said subframe in response to the CSI-RS for said second of said subresources occur in different subframes.

10. The method of claim 9 wherein sending said channel state information in said subframe in response to the CSI-RS for said first of said subresources and sending said channel state information in said subframe in response to the CSI-RS for said second of said subresources are performed on Physical Uplink Control Channel (PUCCH) using one of formats 2, 2a, 2b, or 3.

11. The method of claim 6 wherein said channel state information in response to the CSI-RS for the first of said subresources has a higher priority than said channel state information in response to the CSI-RS for the second of said subresources.

12. The method of claim 6 wherein said base station includes at least one antenna that includes sub-elements arranged to achieve a desired elevation pattern.

13. The method of claim 12 wherein said channel state information for at least one of said subresources includes a parameter reflecting channel information in the elevation domain.

14. The method of claim 13 wherein said channel state information for the other of said subresources includes a parameter reflecting channel information in the horizontal domain.

\* \* \* \* \*